Nov. 1, 1932.  W. W. MOYER  1,885,620
TRAVELING LAWN SPRINKLER FOR IRRIGATING EXTENSIVE SURFACES
Filed Nov. 3, 1931
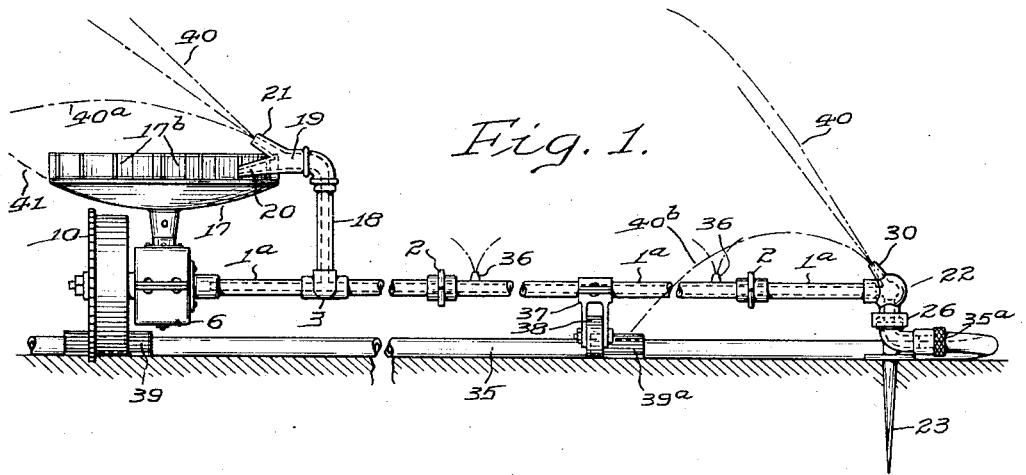
Fig. 1.
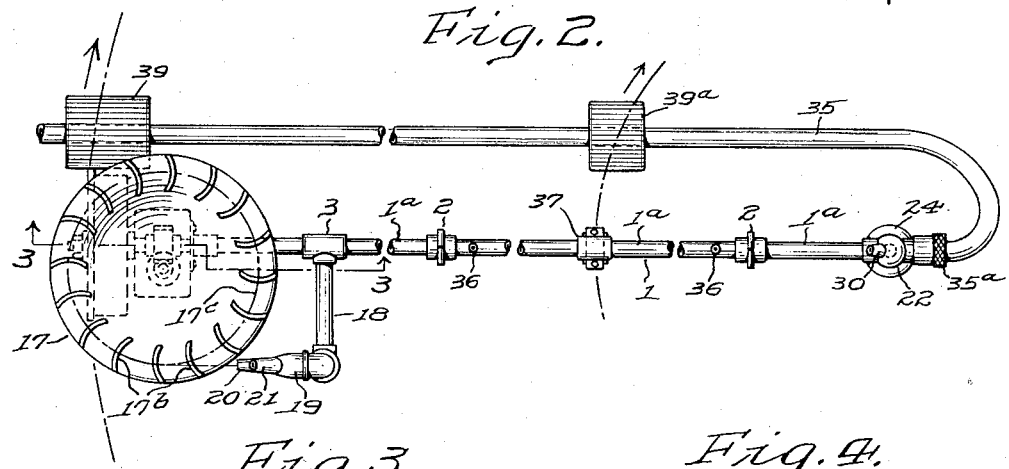
Fig. 2.
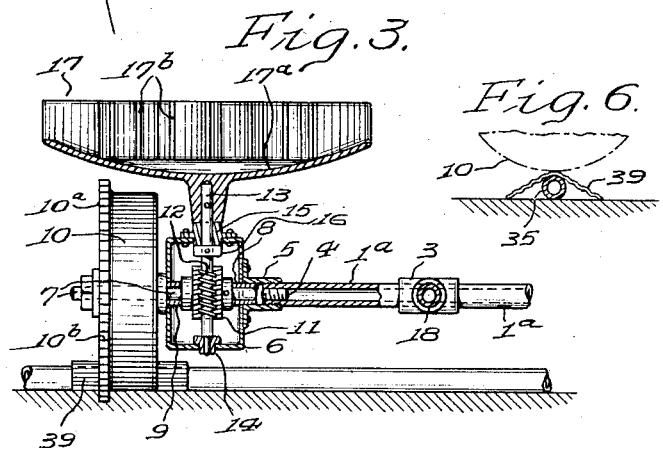
Fig. 3.
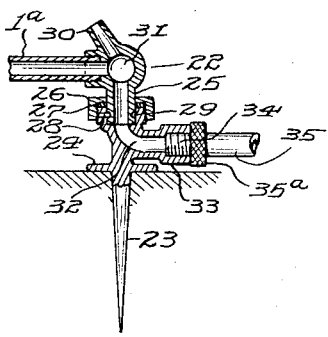
Fig. 4.
Fig. 6.
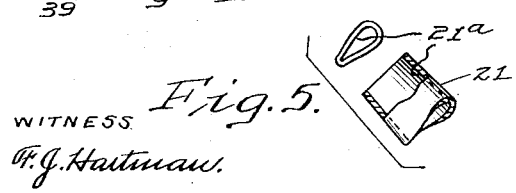
Fig. 5.
WITNESS
F. J. Hartman.
INVENTOR
William W. Moyer,
BY Aston F. Moulton
ATTORNEY

Patented Nov. 1, 1932

1,885,620

UNITED STATES PATENT OFFICE

WILLIAM W. MOYER, OF WEST COLLINGSWOOD, NEW JERSEY

TRAVELING LAWN SPRINKLER FOR IRRIGATING EXTENSIVE SURFACES

Application filed November 3, 1931. Serial No. 572,768.

This invention relates to traveling lawn sprinklers wherein a plurality of sprinkling jets are caused to automatically travel in a circular path around a common pivotal center to which water is supplied under pressure from any suitable source, to distribute the water over a lawn of large area.

One object of this invention is to provide a device which is certain in its operation; wherein the force of a jet of water is used to impel a wheel or rotor by direct impact against vanes provided therein, the rotor being geared positively to a tractor wheel to cause the device to automatically travel in a circular path when water under pressure is applied thereto.

A further object of my invention is to mount the traveling mechanism of the device at one end of a hollow rigid tube or piping composed of any desired number of relatively short sections of pipe separably coupled together, the other end of said piping being pivotally mounted to rotate about a stationary center so that the water supplied through the pipe to the driving mechanism at the free end of the pipe impels a motor mechanism and causes the mechanism and the pipe to travel in a circular path around said center.

A further object of my device is to provide a propeller wheel for operating the traveling lawn sprinkler which is driven by the direct impact of a jet of water against the same, said rotor or propeller wheel being also designed and constructed to effect a distribution of water after impact and after leaving the wheel in a multitude of drops or as a spray over a relatively large area.

A further object of my invention is to provide a traveling lawn sprinkler with nozzles which are operative to somewhat retard the speed of the water leaving the nozzle at the lower side thereof, and to thereby fan out or widen, in a vertical plane, the stream of water leaving the jet and to cause a portion of the water to fall relatively close to the jet from which it issues, thereby distributing the water radially equally over a wide circular belt of lawn.

Other objects of my invention will appear in the specification and claims below.

Referring to the drawing forming a part of this specification and in which the same reference characters are employed to designate like parts throughout various views, Fig. 1 is a side elevational view of my traveling lawn sprinkler.

Fig. 2 is a plan view of the same.

Fig. 3 is a fragmentary view showing the tractor wheel in elevation and the motor mechanism and propelling wheel in vertical section.

Fig. 4 is a vertical sectional view of the hollow pivot and the connection of the piping therewith to permit the device to rotate around the pivot pin.

Fig. 5 is an end and fragmentary longitudinal section of the tip of some of the jets preferably employed in this device for the sake of distributing the water therefrom over a wide band or belt of the lawn; and Fig. 6 is a vertical sectional view through the pipe and through a ramp or riser which I provide to permit the device to traverse the hose by means of which water is supplied, in its circular travel around the pivotal pin.

My device comprises a relatively long metal tube or pipe 1 preferably composed of a plurality of short sections $1^a$ readily separable from each other and connected together by suitable pipe couplings 2 and the three-way union or T coupling 3 to form a length suitable to the size of the plot of land or lot of lawn to be sprinkled. The outermost short section $1a$ is preferably closed by a plug 4, and is threaded into a flanged sleeve 5 rigidly secured to the outside of the casing or housing 6. Within the casing or housing 6 is a shaft 7 mounted in bearings 8, 9, the bearing 8, being preferably within the flanged sleeve 5, and the bearing 9, in alinement therewith being mounted in the opposite side of the housing 6. This shaft passing through the housing 6 and beyond the bearing 9 carries at its outer end a wheel 10 rigidly secured thereto and operating as the driving or tractor wheel of the mechanism. In some instances it may be provided with a flange $10^a$ having teeth or notches $10^b$ to increase its tractive power.

Upon the shaft 7 is rigidly mounted a worm gear 11 meshing with a worm 12 rigid with a vertical spindle 13 also suitably journaled in the casing 6 and preferably provided with a stepped bearing 14 at its lower end and a cylindrical bearing 15. A collar 16 rigid with the spindle 13 may be used to prevent longitudinal movement of the shaft. The upper end of the spindle 13 passes upward through the casing 6 and bearing 15 and carries at its upper end a paddle or propeller wheel 17 preferably having a concave or saucer-like bottom 17$^a$ and having a series of vanes or blades 17$^b$ rising vertically from the said bottom and extending inwardly from the periphery of the wheel and preferably slightly arcuate in horizontal cross-section.

From the T coupling 3 rises a pipe 18 provided at its upper end with a duplex member 19 providing two nozzles 20 and 21. The lower nozzle 20 is preferably provided with a restricted circular opening discharging in a direction slightly downwardly and against the concave sides of the vanes or blades 17$^b$ as they come into alinement therewith. The direction of the water leaving the nozzle 20 is substantially in parallelism with the portion of the concave bottom 17$^a$ of the propeller wheel 17 adjacent the jet and between adjacent blades 17$^b$, and substantially tangential to the pitch line 17$^c$ of the vanes to impact substantially squarely against the convave sides of the vanes or blades as they come into the path or stream of water from the jet or nozzle 20. The other nozzle 21 is preferably directed upwardly and outwardly over and clear of the propeller wheel 17 and is preferably shaped at the discharge end thereof in the manner indicated in Fig. 5, that is to say, the lower portion of the discharge opening is pinched or restricted for the purposes to be described presently below.

The other end of the length of tubing or piping 1 is threaded or otherwise permanently connected to a hollow member 22 freely rotatable about a vertical axis in the top or head of the pin 23 which is adapted to be pressed down into the ground a sufficient distance to firmly anchor the same. The pin 23 is preferably provided with a flange 24 of ample diameter so that when the pin is pushed down into the earth or sod with the flange resting squarely on the earth, the pin itself is firmly anchored stationary with respect to the other parts of the mechanism.

The member 22 may be mounted in the top of the pin 23 in any suitable manner. I have shown the member 22 as provided with a cylindrical extension 25 extending radially therefrom downwardly and passing through a packing gland 26, and a suitable packing 27, into a cylindrical recess in the top of the pin 23 wherein it is retained by a pin 28 projecting into a circular flange 29 adjacent the lower end of the extension 25. In this way the member 22 is mounted to rotate on a vertical axis in the top of the pin 23 in a water tight joint. The member 22 is preferably provided with a jet or nozzle 30 like the upper jet or nozzle 21 and is preferably arranged to discharge upwardly outwardly from the axis of the pin 23.

The rotatable member 22 is hollow, being provided with a chamber 31 and passages leading therefrom to a section 1$^a$ of the piping 1 and to the jet 30. The extension 25 is also provided with an axial passage connecting with the interior of the hollow head of the pin 23. The head of the pin 23 is provided with a passage 32 leading to and through the projection 33 which is provided with threads 34 for the connection thereto of a suitable length of hose 35 by a union or coupling 35$^a$.

I may and preferably do provide the extension 1$^a$ with vertically disposed jets 36 intermediate their ends for spraying water from the pipe vertically upwardly between the ends of the length thereof.

Since the length of tubing or piping 1 may be so long and liable to sag between the pivot pin 23 and the supporting wheel 10, I provide a bracket 37, preferably attachable and detachable from any short section 1$^a$, supporting a wheel or roller 38 to prevent the pipe from dragging along the ground and imposing a heavy load on the propelling mechanism. I also provide one or more ramps 39 and 39$^a$, each comprising, preferably, a strip of metal bent to a wide V and adapted to be placed over the hose 35 at the points where the path of the tractor wheel 10 and the roller 38 crosses the hose to provide an easy incline over which the said supporting wheel 10 and roller 38 may easily travel without becoming jammed and stopped against the side of the hose. These ramps, and particularly that for the wheel 10, may be provided with transverse corrugations or ridges to facilitate the travel of the wheel 10 thereover.

The operation of the device must now be apparent. Water from the hose is conducted through the pin 23 to the length of piping 1, the same being composed of as many sections 1$^a$ as may be necessary to sprinkle the desired area. For a large lawn a number of sections 1$^a$ are thus connected together. For a small lawn, a fewer number are used. The water traverses through the pipe, a small part of it goes through the jets 36 and through the riser pipe 18 whence it is delivered through the two nozzles 20 and 21. That issuing from the jet 20 is small and the stream is preferably circular in transverse cross-section and strikes against the vanes 17$^b$ rotating the propeller wheel 17 in the present instance in a clockwise direction. The rotation of this wheel 15 rotates the spindle 13 and with it the worm 12 which, meshing with the worm wheel 11, rotates the shaft 7 and with it the tractor wheel 10 causing the housing 6 and the outer end of the tubing 1, to travel in a circular path around the pin 23 as a center.

The tip of the jet or nozzle 21 is shown in detail in Fig. 5. Since the orifice in nozzle 30 is like 21, a detail of one is sufficient. The exit orifice 21ª is somewhat pinched or contracted or narrowed in any suitable manner at the lowest point thereof, to form a shape approximating that of a pear inverted, the narrow portion of the opening being lowest. The effect of this narrow or constricted portion of the outlet opening is to slightly check or diminish the rate of speed at which the water issues through the restricted portion, with the result that it is not projected so far away from the nozzle as is the water which issues from the unrestricted or larger portion of the opening. This is indicated diagrammatically in Fig. 1 wherein the lower boundaries 40ª and 40ᵇ of the sprays 40 are shown as curving more rapidly due to the inverted pear shape of the nozzle orifice. In this way, a wide band or belt of lawn is substantially evenly supplied with water as distinguished from a narrower belt or strip as would be the case if the opening were circular.

The paddle or propeller wheel 17 traveling at a high rate of speed circularly, also operates to divide the stream of water passing therethrough into drops and spray and to discharge them, generally speaking, radially from the axis of the propeller wheel in all directions, thereby distributing the water from the jet 20 over a relatively large area. By reason of the fact that the jet 20 is directed slightly downwardly tangential to the adjacent upper surface of the cupped propeller wheel, it generally crosses the bottom of the wheel, and consequently the water leaving the wheel is projected upwardly so that it falls to the ground at a greater distance from the axis of the wheel 15 than it would if the said upper surface of the wheel were plane. The cupping of the propeller wheel 15 and the directing of the jet 20 downwardly are effective to throw the water discharge from the wheel upwardly as indicated by the line 41, in Fig. 1, and further away therefrom than would be possible with a propeller having a plane top.

When the traction wheel 10 in its circular travel, reaches the hose 35, it travels over the ramp 39 without difficulty and the idler roller or wheel 38 rides up over the other ramp 39ª carrying the piping 1 over and clear of the hose.

Having thus described my invention, what I claim and desire to protect by Letters Patent of the United States is:

1. In a traveling lawn sprinkler including a length of rigid tubing, a hollow pivotal rotatable member mounted on a pin adapted to be thrust into the earth, one end of said tubing being coupled to said pivotal member to swing about the axis of said pin on a vertical axis, the combination of a housing rigidly secured to the free end of said length of tubing, a shaft mounted to rotate in said housing on an axis radial to said pivot pin, a traction wheel mounted on said shaft to rotate therewith outside of said housing, a vertical spindle journaled in said housing and extending through the top of said housing, gearing connecting said shaft and said spindle whereby said shaft may be driven from said spindle at a greatly reduced angular speed of rotation, a propeller wheel rigidly secured directly to the upper end of said spindle to rotate therewith in a substantially horizontal plane, and having a circular series of blades, and a branch pipe leading from said tubing upwardly and terminating in a nozzle directed against said blades, the direction of the axis of said nozzle being substantially tangential to the pitch line of the said blades on said propeller wheel.

2. In a traveling lawn sprinkler embodying in its construction a length of rigid tubing, a pin adapted to be thrust into the earth, and provided with a hollow rotatable pivotal member, to which one end of said tubing is coupled to swing horizontally about the vertical axis of said pin, the combination of a housing rigidly secured to the free end of said length of tubing, a shaft, journaled in said housing to rotate on an axis radial to the axis of said pin, a traction wheel mounted on said shaft to rotate therewith outside of said housing, a vertical spindle journaled in said housing and extending through the top of said housing, gearing connecting said shaft and said spindle whereby said shaft may be driven from said spindle at a greatly reduced angular speed of rotation, a propeller wheel, rigidly secured directly to the upper end of said spindle to rotate therewith in a substantially horizontal plane and having a shallow concave upper surface, and a circular series of blades extending upwardly therefrom, and a branch pipe leading from said tubing upwardly and terminating in a nozzle directed against said blades and slightly downwardly to discharge substantially tangentially to the convex upper surface of said propeller wheel.

In witness whereof, I have hereunto set my hand this second day of November, 1931.

WILLIAM W. MOYER.